(12) United States Patent
Lee et al.

(10) Patent No.: US 11,203,795 B2
(45) Date of Patent: Dec. 21, 2021

(54) ULTRA-HIGH STRENGTH STEEL PLATE HAVING EXCELLENT FORMABILITY AND HOLE-EXPANDABILITY, AND METHOD FOR MANUFACTURING SAME

(71) Applicant: POSCO, Pohang-si (KR)

(72) Inventors: Kyoo-Young Lee, Gwangyang-si (KR); Joo-Hyun Ryu, Gwangyang-si (KR); Sea-Woong Lee, Gwangyang-si (KR); Won-Hwi Lee, Gwangyang-si (KR); Byun-Mok Hwang, Gwangyang-si (KR)

(73) Assignee: POSCO, Gyeongsangbuk-Do (KR)

( * ) Notice: Subject to any disclaimer, the term of this patent is extended or adjusted under 35 U.S.C. 154(b) by 736 days.

(21) Appl. No.: 15/769,924

(22) PCT Filed: Oct. 5, 2016

(86) PCT No.: PCT/KR2016/011143
§ 371 (c)(1),
(2) Date: Apr. 20, 2018

(87) PCT Pub. No.: WO2017/078278
PCT Pub. Date: May 11, 2017

(65) Prior Publication Data
US 2020/0248281 A1 Aug. 6, 2020

(30) Foreign Application Priority Data
Nov. 2, 2015 (KR) .......................... 10-2015-0153195

(51) Int. Cl.
*B32B 15/01* (2006.01)
*C22C 38/00* (2006.01)
(Continued)

(52) U.S. Cl.
CPC .............. *C21D 9/46* (2013.01); *B32B 15/013* (2013.01); *C21D 6/005* (2013.01); *C21D 6/008* (2013.01);
(Continued)

(58) Field of Classification Search
CPC ..... C22C 38/04; C22C 38/001; C22C 38/002; C22C 38/02; C22C 38/06; C22C 38/12;
(Continued)

(56) References Cited

U.S. PATENT DOCUMENTS 8,986,468 B2 * 3/2015 Miura .................... C22C 38/06
                                                148/320
2011/0083774 A1 * 4/2011 Jin ......................... C22C 38/50
                                                148/533

(Continued)

FOREIGN PATENT DOCUMENTS

CN   101638749   2/2010
CN   102912219   2/2013
(Continued)

OTHER PUBLICATIONS

European Search Report—European Application No. 16862296.7, dated Jul. 5, 2018, citing CN 101 638 749, JP 2014 025091, CN 102 912 219 and EP 2 778 247.
(Continued)

*Primary Examiner* — Christopher S Kessler
*Assistant Examiner* — Andrew M Cheung
(74) *Attorney, Agent, or Firm* — Cantor Colburn LLP

(57) ABSTRACT

Provided is an ultra-high strength steel plate for automobiles and, more specifically, to an ultra-high strength steel plate having high formability and hole expandability, and a method for manufacturing the ultra-high strength steel plate. The ultra-high strength steel plate includes: by wt %, carbon (C): 0.04% to 0.17%, silicon (Si): 2% or less, manganese
(Continued)

(Mn): 4% to 10%, phosphorous (P): 0.05% or less (excluding 0%), sulfur (S): 0.02% or less (excluding 0%), aluminum (Al): 0.5% or less (excluding 0%), nitrogen (N): 0.02% or less (excluding 0%), and a balance of iron (Fe) and inevitable impurities. Carbon (C) and manganese (Mn) satisfy Formula C+(Mn/25)≤0.46. The ultra high strength steel plate has a microstructure comprising retained austenite in a volume fraction of 20% or greater and annealed martensite in a volume fraction of 50% or greater.

7 Claims, 5 Drawing Sheets

(51) Int. Cl.
  *C22C 38/02* (2006.01)
  *C22C 38/04* (2006.01)
  *C22C 38/06* (2006.01)
  *C22C 38/12* (2006.01)
  *C22C 38/14* (2006.01)
  *C23C 2/06* (2006.01)
  *C23C 2/28* (2006.01)
  *C23C 2/40* (2006.01)
  *C21D 9/46* (2006.01)
  *C21D 6/00* (2006.01)
  *C21D 8/02* (2006.01)

(52) U.S. Cl.
  CPC ......... *C21D 8/0205* (2013.01); *C21D 8/0247* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C23C 2/06* (2013.01); *C23C 2/28* (2013.01); *C23C 2/40* (2013.01); *C21D 2211/001* (2013.01); *C21D 2211/008* (2013.01)

(58) Field of Classification Search
  CPC .......... C22C 38/14; C21D 9/46; C21D 6/005; C21D 6/008; C21D 8/0205; C21D 8/0247; C21D 2211/001; C21D 2211/008; B32B 15/013; C23C 2/06; C23C 2/28; C23C 2/40
  See application file for complete search history.

(56) References Cited

U.S. PATENT DOCUMENTS

| | | |
|---|---|---|
| 2013/0295402 A1 | 11/2013 | Oh et al. |
| 2014/0230971 A1 | 8/2014 | Kawasaki et al. |
| 2014/0308156 A1* | 10/2014 | Oh .......................... C23C 2/02 420/73 |
| 2014/0360632 A1 | 12/2014 | Hasegawa et al. |
| 2015/0203947 A1 | 7/2015 | Hasegawa et al. |
| 2016/0194739 A1 | 7/2016 | Del Frate et al. |
| 2016/0333448 A1 | 11/2016 | Hayashi et al. |
| 2017/0130286 A1 | 5/2017 | Hayashi |

FOREIGN PATENT DOCUMENTS

| | | |
|---|---|---|
| CN | 103060678 | 4/2013 |
| CN | 103392022 | 11/2013 |
| CN | 103890202 | 6/2014 |
| CN | 103917681 | 7/2014 |
| CN | 104024452 | 9/2014 |
| EP | 2778247 | 9/2014 |
| JP | 07188834 | 7/1995 |
| JP | 2011523442 | 8/2011 |
| JP | 2013076162 | 4/2013 |
| JP | 2014025091 | 2/2014 |
| JP | 2015151576 | 8/2015 |
| JP | 2016529392 | 9/2016 |
| KR | 20000043762 | 7/2000 |
| KR | 20120070739 | 7/2012 |
| KR | 20120073407 | 7/2012 |
| KR | 20130002977 | 1/2013 |
| KR | 20130027794 | 3/2013 |
| KR | 20130056051 A * | 5/2013 |
| KR | 20140060574 | 5/2014 |
| KR | 20140075789 | 6/2014 |
| WO | 2013038637 | 3/2013 |
| WO | 2014020640 | 2/2014 |
| WO | 2015102050 | 7/2015 |
| WO | 2016010144 | 1/2016 |

OTHER PUBLICATIONS

International Search Report—PCT/KR2016/011143 dated Dec. 8, 2016.

* cited by examiner

ULTRA-HIGH STRENGTH STEEL PLATE HAVING EXCELLENT FORMABILITY AND HOLE-EXPANDABILITY, AND METHOD FOR MANUFACTURING SAME

TECHNICAL FIELD

The present invention relates to an ultra high strength steel plate for automobiles and, more particularly, to an ultra high strength steel plate having high formability and hole expandability, and a method for manufacturing the ultra high strength steel plate.

BACKGROUND ART

Steel plates for automotive applications are required to have a relatively thin thickness for weight reduction, but are also required to have a thick thickness, or markedly high strength for crash safety.

To this end, materials having high strength and improved formability are required, and it is known that steel plates made of advanced high strength steel (AHSS) such as dual phase (DP) steel, transformation induced plasticity steel (TRIP), or complex phase (CP) steel are suitable as automotive steel plates.

Although the strength of AHSS may be increased by increasing the content of carbon (C) or adding alloying elements, the tensile strength of AHSS is practically limited to about a 1200 MPa grade when practical aspects such as spot weldability are considered.

In this regard, martensitic steel is designed to provide high levels of strength by utilizing martensite.

However, martensitic steel has very low elongation, and thus, the application of martensitic steel is limited to simple parts formed through a roll forming process.

In addition, as a steel plate applicable to structural members guaranteeing crash safety, hot press forming (HPF) steel made through a high-temperature forming process and a water cooling process, that is, a rapid cooling process by means of direct contact with dies, has been popular. However, it is difficult to apply HPF steel to a variety of applications because of excessive equipment costs and an increase in heat treatment and process costs.

Therefore, there is increasing demand for materials processable through a cold press forming process incurring lower costs than a hot press forming process.

In the related art, various techniques have been developed to adjust the product of tensile strength and elongation to be 25,000 MPa % or greater.

For example, in Patent Document 1, steel having a manganese (Mn) content of 3.5% to 9.0% is used to guarantee superior physical qualities, that is, the product of tensile strength and elongation is within the range of 30,000 MPa % or greater, but the yield ratio of the steel is low for example about 0.43 to about 0.65 and the maximum yield strength of the steel is also low for example about 720 MPa. Thus, the steel may not be competitive with general 1.5 GPa grade HPF steel having a yield strength of about 1050 MPa after heat treatment.

In addition, Patent Document 2 relates to a technique for improving the low-temperature toughness of reverse transformed DP steel including manganese (Mn) in an amount of 2% to 9% by refining grains of the DP steel through thermal deformation within the temperature range of 100° C. to Ac1+50° C. Although the yield strength of the DP is improved, the disclosed technique requires a warm deformation process at the end of the manufacturing processes.

Furthermore, Patent Documents 1 and 2 do not disclose results of evaluation of hole expandability, stretch flangeability, or edge ductility required for guaranteeing formability of stretch flanges during a press forming process, and also do not disclose any method for improving these properties.

However, when actual press forming processes including various forming modes are considered, it is necessary to develop products having improved hole expandability for guaranteeing bendability and edge ductility, in addition to elongation relating to drawability and stretchability.

Furthermore, Patent Document 3 proposes a method of enabling a continuous annealing process by adding aluminum (Al) to a steel containing manganese (Mn) in an amount of 3% to 7% to increase the Ac1 temperature of the steel. Although the product of tensile strength and elongation of the steel is high, any technique for improving the hole expandability of the steel is not disclosed, and thus it is unclear as to whether press formability can be guaranteed.

Furthermore, Patent Documents 4 and 5 disclose a method of producing a high-strength steel sheet having a tensile strength of 980 MPa or greater and a product of tensile strength and elongation within the range of 24,000 MPa % or greater by using steel containing manganese (Mn) in an amount of 3.5% to 10%. However, when a coil wound after hot rolling is heat treated, heat treatment is performed at the Ac1 transformation point or lower. Thus, the amount of austenite is increased and the formation of annealed martensite are suppressed by preferential partitioning of manganese (Mn), thereby failing to efficiently guarantee cold deformability. In addition, since processes such as a final annealing process and an intermediate annealing process are performed only on a dual phase region, it is expected that a final microstructure will have a large hardness difference between ferrite and other phases, and thus, there is a high possibility that final products will have poor yield strength and hole expandability. Furthermore, the above-mentioned documents do not disclose any method for improving yield strength and hole expandability, and only evaluate bendability. That is, the documents disclose methods that may only be suitable for forming simple parts. However, the disclosed methods are not suitable for forming complex parts through press forming processes.

(Patent Document 1) Chinese Patent Application Laid-open Publication No: 101638749

(Patent Document 2) Chinese Patent Application Laid-open Publication No: 103060678

(Patent Document 3) Korean Patent Application Laid-open Publication No: 2012-0070739

(Patent Document 4) Korean Patent Application Laid-open Publication No. 2014-0060574 (Patent Document 5) International Application No: PCT-JP2012-005706

DISCLOSURE

Technical Problem

The present invention may provide an ultra high strength steel plate having high yield strength for use as a material for crashworthy structural members and also having high hole expandability for guaranteeing high press formability, and a method for manufacturing the ultra high strength steel plate.

Technical Solution

According to an aspect of the present invention, there is provided an ultra high strength steel plate having high formability and hole expandability, the ultra high strength steel plate including, by wt %, carbon (C): 0.04% to 0.17%, silicon (Si): 2% or less, manganese (Mn): 4% to 10%, phosphorous (P): 0.05% or less (excluding 0%), sulfur (S): 0.02% or less (excluding 0%), aluminum (Al): 0.5% or less (excluding 0%), nitrogen (N): 0.02% or less (excluding 0%), and a balance of iron (Fe) and inevitable impurities, wherein carbon (C) and manganese (Mn) satisfy Formula 1 below, and the ultra high strength steel plate has a microstructure including retained austenite in a volume fraction of 20% or greater and annealed martensite in a volume fraction of 50% or greater, $$C+(Mn/25) \leq 0.46. \quad \text{[Formula 1]}$$

According to another aspect of the present invention, there is provided a method for manufacturing an ultra high strength steel plate having high formability and hole expandability, the method including: reheating a steel slab satisfying the above-described composition and formula to a temperature of 1100° C. to 1300° C.; finish hot rolling the reheated steel slab within a temperature range of Ar3 to 1000° C. so as to form a hot-rolled steel plate; coiling the hot-rolled steel plate at a temperature of 720° C. or less; heat treating the coiled hot-rolled steel plate within a temperature range of Ac1 to Ac1+((Ac3−Ac1)/2) for 30 minutes or longer; pickling and cold rolling the heat-treated hot-rolled steel plate so as to manufacture a cold-rolled steel plate; primarily annealing the cold-rolled steel plate within a temperature range of Ac3 or higher for seconds or longer, and then cooling the cold-rolled steel plate; and secondarily annealing the primarily annealed and cooled cold-rolled steel plate within a temperature range of 550° C. to 620° C. for 30 minutes or longer.

Advantageous Effects

The present invention provides an ultra high strength steel plate having superior mechanical properties for improving crashworthy performance and formability required for automotive structural members, that is, having high yield strength, elongation, and hole expandability.

The ultra high strength steel plate of the present invention is suitable for cold pressing forming, and thus existing hot press formed parts may be replaced with relatively inexpensive cold press formed parts. In addition, the present invention may provide an ecofriendly process because the production of $CO_2$ in high-temperature forming processes is prevented.

BEST MODE

Figure 1:
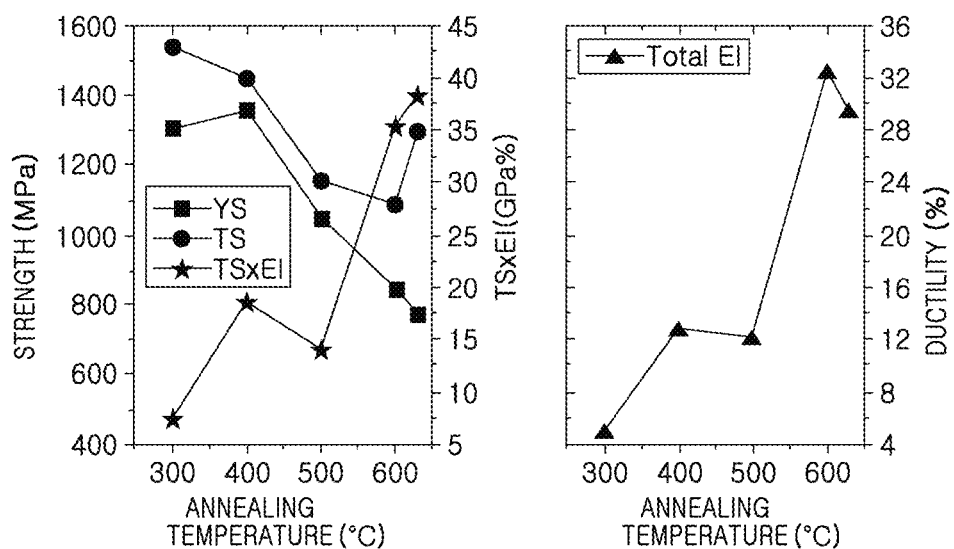
FIG. 1 illustrates graphs showing mechanical properties with respect to temperature during a final annealing process (secondary annealing) of Inventive Steel 4 according to an example of the present invention.

The inventors have conducted in-depth research for developing a steel material suitable for a cold press forming process incurring lower costs than a hot press forming process, and having mechanical properties equal to or better than those of hot press formed parts. As a result, the inventors have found that if the composition and manufacturing conditions of steel are optimized, a steel plate having a microstructure suitable for cold press forming can be provided. Based on this finding, the inventors have invented the present invention.

Embodiments of the present invention will now be described in detail.

An aspect of the present invention provides an ultra high strength steel plate having high formability and hole expandability, the ultra high strength steel plate including, by wt %, carbon (C): 0.04% to 0.17%, silicon (Si): 2% or less, manganese (Mn): 4% to 10%, phosphorous (P): 0.05% or less (excluding 0%), sulfur (S): 0.02% or less (excluding 0%), aluminum (Al): 0.5% or less (excluding 0%), nitrogen (N): 0.02% or less (excluding 0%), and the balance of iron (Fe) and inevitable impurities, wherein carbon (C) and manganese (Mn) may satisfy Formula 1 below:

$$C+(Mn/25) \leq 0.46. \quad \text{[Formula 1]}$$

Hereinafter, reasons for limiting the alloy composition of the ultra high strength steel plate of the present invention will be described in detail. In the following description, the content of each element is given in wt % unless otherwise specified.

Carbon (C): 0.04% to 0.17%

Carbon (C) is a key element added to stabilize retained austenite, and to this end, it may be preferable that the content of carbon (C) be 0.04% or greater. However, if the content of carbon (C) is greater than 0.17%, the relationship between carbon (C) and manganese (Mn) may not satisfy the range proposed in the present invention, and characteristics for spot welding, which is used as a key technique for joining automotive structural members, may deteriorate.

Therefore, according to the present invention, it may be preferable that the content of carbon (C) be within the range of 0.04% to 0.17%.

Silicon (Si): 2% or less

Silicon (Si) suppresses the precipitation of carbides in ferrite and facilitates diffusion of carbon (C) from ferrite into austenite, thereby contributing to stabilization of retained austenite. However, if the content of silicon (Si) is greater than 2%, hot and cold rolling properties may be markedly deteriorated, and Si oxides lowering hot-dip platability may be formed on the surface of steel. Thus, preferably, the content of silicon (Si) may be adjusted to be 2% or less.

In the present invention, the content of silicon (Si) may be 0% because the stability of retained austenite is easily guaranteed by addition of a large amount of manganese (Mn) (described later) without addition of silicon (Si).

Manganese (Mn): 4% to 10%

Manganese is a key element added to phase-transformation steel for suppressing ferrite transformation during cooling as well as for guaranteeing formation and stabilization of retained austenite. If the content of manganese (Mn) is less than 4%, ferrite transformation may easily occur, and the formation of austenite is insufficient, thereby making it difficult to adjust the product of tensile strength and elongation to be 25,000 MPa % or greater. Conversely, if the content of manganese (Mn) is greater than 10%, the relationship between manganese (Mn) and carbon (C) may not satisfy the range proposed in the present invention.

Therefore, according to the present invention, it may be preferable that the content of manganese (Mn) be within the range of 4% to 10%.

In addition, according to the present invention, the relationship between carbon (C) and manganese (Mn) may satisfy Formula 1 below, and if the relationship between carbon (C) and manganese (Mn) is greater than 0.46, an intended hole expansion ratio (HER) may not be stably guaranteed. Therefore, preferably, the relationship of Formula 1 may be 0.46 or less.

$$C+(Mn/25) \leq 0.46. \quad [\text{Formula 1}]$$

Phosphorous (P): 0.05% or less (excluding 0%)

Phosphorous (P) is an element having a solid-solution strengthening effect. However, if the content of phosphorus (P) is greater than 0.05%, weldability deteriorates, and the possibility of embrittlement of steel increases. Thus, preferably, the upper limit of the content of phosphorus (P) may be set to be 0.05%. More preferably, the upper limit of the content of phosphorus (P) may be set to be 0.02%.

Sulfur (S): 0.02% or less (excluding 0%)

Sulfur (S) is an element existing in steel as an impurity, and lowers the ductility and weldability of the steel plate. If the content of sulfur (S) is greater than 0.02%, the ductility and weldability of the steel plate are likely to decrease. Thus, preferably, the upper limit of the content of sulfur (S) may be set to be 0.02%.

Aluminum (Al): 0.5% or less (excluding 0%)

Aluminum (Al) also contributes to the stabilization of retained austenite by suppressing the formation of carbides in ferrite. However, if the content of aluminum (Al) increases, it is difficult to manufacture a normal slab because aluminum (Al) may reacts with mold flux during a casting process, and aluminum (Al) may form surface oxides having a negative effect on hot-dip platability. In addition, aluminum (Al) raises Ac1. Thus, the content of aluminum (Al) may be adjusted to be 0.5% or less.

Nitrogen (N): 0.02% or less (excluding 0%)

Nitrogen (N) is effective in stabilizing austenite.

However, if the content of nitrogen (N) is greater than 0.02%, the possibility of embrittlement increases, and nitrogen (N) may combine with aluminum (Al) to result in excessive precipitation of AlN leading to deterioration of continuous casting qualities. Therefore, it may be preferable that the upper limit of the content of nitrogen (N) be 0.02%.

In addition to the above-described elements, the ultra high strength steel plate of the present invention may further include the following elements for improvements in mechanical properties.

First, the ultra high strength steel plate may further include at least one selected from molybdenum (Mo), titanium (Ti), niobium (Nb), and vanadium (V).

Molybdenum (Mo): 0.5% or less (excluding 0%)

Molybdenum (Mo) is effective in suppressing the formation of ferrite by increasing the hardenability of steel. In addition, molybdenum (Mo) has an effect of suppressing the formation of ferrite during a cooling process after an annealing process. In addition, molybdenum (Mo) contributes to an increase in strength by forming fine carbides. However, if the content of molybdenum (Mo) is greater than 0.5%, the production cost of alloy iron increases due to excessive alloy addition. Thus, preferably, the content of molybdenum (Mo) may be adjusted to be 0.5% or less.

Titanium (Ti): 0.1% or less (excluding 0%)

Titanium (Ti) forms fine carbides and thus guarantees strength. In addition, titanium (Ti) is a nitride forming element scavenging nitrogen (N) from steel by precipitating TiN, and thus titanium (Ti) suppresses precipitation of AlN and lowers the possibility of cracking during a continuous casting process. Although it is preferably that titanium (Ti) be stoichiometrically added in an amount of 48/14*[N] or greater, if the content of titanium (Ti) is greater than 0.1%, strength may decrease because of precipitation of coarse carbides and a decrease in the content of carbon (C) in steel. Further, nozzle clogging may occur during a continuous casting process.

Niobium (Nb): 0.1% or less (excluding 0%)

Niobium (Nb) segregates along austenite grain boundaries and thus prevents austenite grain coarsening during an annealing process. In addition, niobium (Nb) increases strength by forming fine carbides. However, if the content of niobium (Nb) is greater than 0.1%, strength may decrease because of precipitation of coarse carbides and a decrease in the content of carbon (C) in steel, and the production cost of alloy iron may increase because of excessive alloy addition.

Vanadium (V): 0.2% or less (excluding 0%)

Vanadium (V) is an element increasing strength by forming low-temperature precipitates. However, if the content of vanadium (V) is greater than 0.2%, strength may decrease because of precipitation of coarse carbides and a decrease in the content of carbon (C) in steel, and the production cost of alloy iron may increase because of excessive alloy addition.

In addition, according to the present invention, the ultra high strength steel plate may further include at least one selected from zirconium (Zr) and tungsten (W).

At least one selected from zirconium (Zr): 0.001% to 0.1%, and tungsten (W): 0.001% to 0.5%

Like titanium (Ti), niobium (Nb), vanadium (V), and molybdenum (Mo), zirconium (Zr) and tungsten (W) are effective in precipitation strengthening and grain refinement of the steel plate. However, if the content of each of zirconium (Zr) and tungsten (W) is less than 0.001%, it is difficult to obtain the above-mentioned effects. Conversely, if the content of zirconium (Zr) is greater than 0.1% or the content of tungsten (W) is greater than 0.5%, the above-mentioned effects are saturated, and manufacturing costs increase. In addition, ductility may decrease due to excessive formation of precipitates.

In addition, the ultra high strength steel plate may further include at least one selected from nickel (Ni), copper (Cu), and chromium (Cr).

At least one selected from Ni: 1% or less (excluding 0%), Cu: 0.5% or less (excluding 0%), and Cr: 1% or less (excluding 0%)

Nickel (Ni), copper (Cu), and chromium (Cr), which are elements contributing to stabilization of retained austenite, interact with elements such as carbon (C), silicon (Si), manganese (Mn), or aluminum (Al), and stabilize retained austenite. However, if the contents of nickel (Ni), copper (Cu), and chromium (Cr) are respectively greater than 1%, 0.5%, and 1%, manufacturing costs may increase excessively.

In addition, copper (Cu) may cause embrittlement during a hot rolling process, and thus, when copper (Cu) is added, nickel (Ni) may also be added, together with copper (Cu).

In addition, the ultra high strength steel plate may further include at least one selected from antimony (Sb), calcium (Ca), and boron (B).

At least one selected from antimony (Sb): 0.04% or less (excluding 0%), calcium (Ca): 0.01% or less (excluding 0%), and boron (B): 0.01% or less (excluding 0%)

Antimony (Sb) segregates along grain boundaries and thus suppresses movement of surface oxide forming elements such as silicon (Si) and aluminum (Al), thereby improving the surface quality of a plating layer. However, if the content of antimony (Sb) is greater than 0.04%, this effect is saturated.

Calcium (Ca) is an element effective in improving workability by controlling the shape of sulfides. However, if the content of calcium (Ca) is greater than 0.01%, this effect is saturated.

In addition, boron (B) improves hardenability in combination with elements such as manganese (Mn) or chromium (Cr), thereby suppressing soft ferrite transformation during cooling from a high temperature. However, if the content of boron (B) is greater than 0.01%, boron (B) is excessively concentrated on the surface of the steel plate when the steel plate is plated, thereby decreasing plating adhesion. Thus, it may be preferable that the upper limit of the content of boron (B) be 0.01%.

The balance of the ultra high strength steel plate of the present invention is iron (Fe). However, impurities of raw materials or steel manufacturing environments may be inevitably included in the ultra high strength steel plate, and such impurities may not be removed from the ultra high strength steel plate. Such impurities are well-known to those of ordinary skill in the steel manufacturing industry, and thus descriptions thereof will not be provided in the present invention.

According to the present invention, preferably, the ultra high strength steel plate satisfying the above-described composition may have a microstructure including retained austenite in a volume fraction of 20% or greater, annealed martensite in a volume fraction of 50% or greater, and the balance of other phases including fresh martensite and ε-martensite.

As described above, since the ultra high strength steel plate of the present invention includes a combination of retained austenite and annealed martensite, the ultra high strength steel plate may have a tensile strength of 980 MPa or greater and a yield ratio (yield strength/tensile strength) of 0.6 or greater owing to high yield strength. In addition, the ultra high strength steel plate may have a product of tensile strength and elongation within the range of 25,000 MPa % or greater and an HER of 15% or greater.

If the volume fraction of retained austenite is less than 20% or the volume fraction of annealed martensite is less than 50%, ultra high strength may not be guaranteed, and ductility and hole expandability may also not be guaranteed.

In addition, the ultra high strength steel plate of the present invention is manufactured through a processes to be described later. In this case, after a primary annealing process, that is, before a second annealing process, the microstructure of the ultra high strength steel plate may include two phases: martensite and retained austenite, and the amount of the retained austenite may preferably be 1% or greater.

This is for suppressing a hardness difference between phases caused by recrystallization occurring when the steel plate is annealed after a cold rolling process, and also for facilitating the formation of austenite during a secondary annealing process and thus increasing the fraction of retained austenite in a final microstructure.

The ultra high strength steel plate of the present invention having the above-described composition and microstructure may be a cold-rolled steel plate. In addition, the ultra high strength steel plate may be a hot-dip galvanized steel plate or a hot-dip galvannealed steel plate.

Hereinafter, a method for manufacturing a ultra high strength steel plate having high formability and hole expandability will be described in detail according to an aspect of the present invention.

First, a method for manufacturing a cold-rolled steel plate will be described in detail according to the present invention.

According to the present invention, a cold-rolled steel plate may be manufactured by preparing a steel slab having the above-described composition, and processing the steel slab through a reheating process, a hot rolling process, a coiling process, a heat treatment process, a cold rolling process, and a multi-step annealing process. In the following description, conditions of the processes will be described in detail.

(Reheating of Steel Slab)

According to the present invention, before the hot rolling process, the steel slab is reheated to homogenize the steel slab, and preferably, the temperature of reheating may be within the range of 1100° C. to 1300° C.

If the reheating temperature is less than 1100° C., the process load of the subsequent hot rolling process is markedly increased. Conversely, if the reheating temperature is greater than 1300° C., the amount of surface scale increases to cause material loss, and a liquid phase may be present if the steel slab has a large amount of manganese (Mn). Therefore, it may be preferable that the reheating temperature be adjusted to be within the range of 1100° C. to 1300° C.

(Hot Rolling)

A hot-rolled steel plate is manufactured by hot rolling the reheated steel slab, and in this case, finish hot rolling may preferably be performed within the temperature range of Ar3 to 1000° C.

If the finish hot rolling temperature is less than Ar3 (a temperature at which austenite starts to transform into ferrite during cooling), rolling is performed on a ferrite-austenite dual phase region or a ferrite region, thereby forming a mixed grain structure and causing trouble due to hot rolling load variations. Conversely, if the finish hot rolling temperature is greater than 1000° C., the possibility of surface defects increases because of scale.

(coiling)

The hot-rolled steel plate manufactured as described above is preferably coiled at a temperature of 720° C. or less.

If the coiling temperature is greater than 720° C., an oxide film may be excessively formed on the surface of the steel plate, causing defects. Therefore, the upper limit of the coiling temperature may preferably be set to 720° C.

As the coiling temperature decreases, the strength of the hot-rolled steel plate increases, and thus the load of the subsequent cold rolling process increases. In addition, since a large amount of manganese (Mn) is added in the present invention, when the hot-rolled steel plate is cooled to room temperature after being coiled, due to increased hardenability, martensite is formed in large amounts without transformation to soft phases such as ferrite, thereby markedly increasing the strength of the hot-rolled steel plate. In the present invention, thus, the following heat treatment process is performed before the cold rolling process. Owing to this heat treatment process, a low coiling temperature may not be problematic, and thus, the lower limit of the coiling temperature is not particularly limited.

(Heat Treatment)

Before the coiled hot-rolled steel plate is cold rolled, the coiled hot-rolled steel plate may be heat treated within a certain temperature range. Preferably, the heat treatment may be performed for 30 minutes or longer within the temperature range of Ac1 to Ac1+((Ac3−Ac1)/2).

Ac1 refers to a temperature at which austenite starts to appear during heating, and Ac3 refers to a temperature at which transformation to austenite occurs in an amount of 100% during heating. These temperatures are not phase equilibrium points but temperatures given by considering phase transformation kinetics during real heating.

In the present invention, due to a high Mn content in the steel plate, martensite is formed in large amounts after the coiling process of the hot-rolled steel plate, and austenite is present in some amounts due to high contents of alloying elements. If this hot-rolled steel plate is heated, the strength of the hot-rolled steel plate decreases because martensite is tempered. However, there is a limit to effectively decreasing the strength of the hot-rolled steel plate through only tempering. Therefore, the heat treatment is performed at Ac1 or higher to form additional austenite and induce effective movement of carbon (C) to austenite from martensite having a BCC structure, so as to attain a decrease in strength. However, if the heat treatment temperature increases, austenite is formed in excessive amounts, and much of this austenite transforms into martensite during the cold rolling process, thereby inversely increasing the process load of the cold rolling process. Therefore, according to the present invention, before the cold rolling process after the coiling process, the heat treatment is preferably performed within the temperature range of Ac1 to Ac1+((Ac3−Ac1)/2).

(Pickling and Cold Rolling)

After the heat treatment, the hot-rolled steel plate is pickled to remove an oxide layer, and is then cold rolled to manufacture a cold-rolled steel plate having an intended shape and thickness.

The cold rolling process is performed to guarantee a thickness required by a customer, and the reduction ratio of the cold rolling process is not particularly limited. In general, the lower limit of the reduction ratio of a cold rolling process is set by considering recrystallization in a subsequent annealing process. However, according to the present invention, the reduction ratio is not limited because austenite single phase annealing is performed at Ac3 or greater as a primary annealing process.

(Annealing)

The present invention is directed to obtain an ultra high strength steel plate having superior yield strength, elongation, and hole expandability, and to this end, it is necessary to control a subsequent annealing process.

In particular, the temperature range of a final annealing process (corresponding to a secondary annealing process described later) is adjusted to guarantee the formation of a final microstructure including retained austenite and annealed martensite in combination and to obtain intended mechanical characteristics from the final microstructure.

Primary Annealing

The cold-rolled steel plate manufactured as described above is preferably annealed at a temperature of Ac3 or higher for 30 seconds or longer, and is then cooled.

In the present invention, this primary annealing process is performed to guarantee the formation of a dual phase structure including annealed martensite and retained austenite after the final annealing process (corresponding to the secondary annealing process described below). In addition, if the final annealing process is directly performed on the cold-rolled steel plate without performing the primary annealing process, modified annealed martensite formed during the cold rolling process recrystallizes during the final annealing process, thereby causing a hardness difference between phases. Thus, the primary annealing process is performed to prevent this. To this end, the primary annealing process may be performed as a single phase annealing process.

Secondary Annealing

After the cold-rolled steel plate is primarily annealed and cooled, the cold-rolled steel plate is secondarily annealed within a dual phase temperature range. Preferably, this secondary annealing process may be performed within the temperature range of 550° C. to 620° C. for 30 minutes or longer.

If the secondary annealing temperature is less than 550° C., austenite is not sufficiently formed, and thus strength and ductility are not guaranteed. Conversely, if the secondary annealing temperature is greater than 620° C., although strength and ductility are sufficiently guaranteed, excessive partitioning of carbon (C) and manganese (Mn) into excessively formed austenite may occur, thereby increasing a hardness different between phases and lowering hole expandability.

In addition, if the secondary annealing process time is less than 30 minutes, retained austenite is formed in an amount of less than 20%, and thus, all the intended mechanical characteristics may not be obtained. Therefore, the secondary annealing process time may preferably be 30 minutes or longer.

If these annealing processes are performed according to the present invention, although a cold press forming process incurring relatively low costs is performed instead of a hot press forming process, the yield strength of cold press formed parts may be high owing to work hardening after the forming process, and thus the cold press formed parts may be equivalent to hot press formed parts. In addition, since the cold press formed parts have higher elongation than hot press formed parts having only several percents of elongation, the cold press formed parts may have a high shock-absorbing ability after being manufactured.

In addition, the cold-rolled steel plate manufactured through all the above-described processes may be dipped into a zinc plating bath or a zinc alloy plating bath to manufacture a steel plate plated with a hot-dip zinc plating layer or a hot-dip zinc alloy plating layer.

In this case, the zinc alloy plating bath may be a zinc-aluminum plating bath, a zinc-aluminum-magnesium plating path, or the like.

In addition, an aluminum-silicon plating bath or an aluminum-silicon-magnesium plating bath may be used to manufacturing a plated steel plate.

Moreover, an alloying heat treatment may be performed on the plated steel plate having the above-described plating layer within the temperature range of 480° C. to 600° C. to manufacture an alloy-plated steel plate.

[Mode for Invention]

Hereinafter, the present invention will be described more specifically through examples. However, the following examples is not for purposes of limitation. The scope of the present invention is defined by the appended claims, and modifications and variations may be reasonably made therefrom.

Examples 30-kg ingots were prepared by performing a vacuum melting process on steels having compositions shown in Table 1. After maintaining the 30-kg ingots at 1200° C. for 1 hour, a hot rolling process including a finish rolling process at 900° C. was performed on the 30-kg ingots. Then, samples made as described above are inserted into a furnace heated to 600° C., maintained in the furnace for 1 hour, and cooled in the furnace. In this manner, hot rolling and coiling were simulated. Thereafter, the samples were cooled to room temperature and heat treated at 600° C. for 10 hours. Then, a pickling process and a cold rolling process having a reduction ratio of 50% were performed on the samples to manufacture cold-rolled steel plates.

These cold-rolled steel plates were annealed under conditions shown in Table 2 (only a final annealing process or both primary and secondary annealing processes were performed), and then mechanical properties of samples of the cold-rolled steel plates were measured as shown in Table 2.

TABLE 1

| Steels | Composition (wt %) | | | | | | | | | | | C + Mn/25 |
|---|---|---|---|---|---|---|---|---|---|---|---|---|
| | C | Si | Mn | Ti | Nb | V | Mo | Al | P | S | N | |
| Comparative Steel 1 | 0.18 | 1.46 | 2.59 | 0.02 | 0 | 0 | 0 | 0.501 | 0.01 | 0.0056 | 0.0044 | 0.284 |
| Comparative Steel 2 | 0.174 | 1.5 | 3.36 | 0 | 0 | 0 | 0 | 0.031 | 0.011 | 0.002 | 0.0058 | 0.308 |
| Inventive Steel 1 | 0.14 | 0 | 7.02 | 0 | 0 | 0 | 0 | 0.012 | 0.011 | 0.008 | 0.0055 | 0.421 |
| Comparative Steel 3 | 0.195 | 0 | 7.06 | 0 | 0 | 0 | 0 | 0.015 | 0.011 | 0.0095 | 0.0046 | 0.477 |
| Inventive Steel 2 | 0.14 | 0.47 | 7.16 | 0 | 0 | 0 | 0 | 0.021 | 0.01 | 0.008 | 0.0036 | 0.426 |
| Inventive Steel 3 | 0.139 | 0.5 | 6.92 | 0.031 | 0 | 0.102 | 0 | 0.022 | 0.01 | 0.0045 | 0.0042 | 0.416 |
| Comparative Steel 4 | 0.186 | 0.51 | 7.05 | 0 | 0 | 0 | 0 | 0.016 | 0.012 | 0.007 | 0.0055 | 0.468 |
| Comparative Steel 5 | 0.188 | 0.5 | 7.2 | 0.032 | 0.042 | 0 | 0 | 0.024 | 0.012 | 0.0067 | 0.006 | 0.476 |
| Comparative Steel 6 | 0.19 | 0.496 | 7.04 | 0.033 | 0 | 0.103 | 0 | 0.028 | 0.011 | 0.007 | 0.006 | 0.472 |
| Inventive Steel 4 | 0.14 | 0.99 | 6.9 | 0.031 | 0.04 | 0 | 0 | 0.05 | 0.01 | 0.001 | 0.006 | 0.416 |
| Inventive Steel 5 | 0.141 | 1.01 | 7.25 | 0.058 | 0.042 | 0 | 0.248 | 0.034 | 0.0064 | 0.0055 | 0.0047 | 0.431 |
| Inventive Steel 6 | 0.14 | 1.51 | 6.9 | 0.034 | 0.04 | 0 | 0 | 0.05 | 0.01 | 0.001 | 0.006 | 0.416 |
| Inventive Steel 7 | 0.147 | 0.99 | 7.16 | 0.025 | 0.043 | 0 | 0.246 | 0.027 | 0.0095 | 0.0085 | 0.0055 | 0.433 |
| Inventive Steel 8 | 0.145 | 1.44 | 7.14 | 0.028 | 0.04 | 0 | 0.243 | 0.028 | 0.0093 | 0.0028 | 0.0047 | 0.431 |
| Inventive Steel 9 | 0.149 | 1.5 | 6.18 | 0.026 | 0.044 | 0 | 0.245 | 0.023 | 0.009 | 0.009 | 0.005 | 0.396 |
| Inventive Steel 10 | 0.145 | 1.52 | 5.21 | 0.029 | 0.043 | 0 | 0.24 | 0.018 | 0.0088 | 0.0063 | 0.005 | 0.353 |
| Comparative Steel 7 | 0.142 | 0.99 | 8.2 | 0.031 | 0.039 | 0 | 0 | 0.036 | 0.011 | 0.007 | 0.0055 | 0.470 |
| Comparative Steel 8 | 0.142 | 1.04 | 9.2 | 0.029 | 0.041 | 0 | 0 | 0.032 | 0.012 | 0.007 | 0.004 | 0.510 |
| Inventive Steel 11 | 0.05 | 1.01 | 8.97 | 0 | 0 | 0 | 0 | 0.039 | 0.0067 | 0.0052 | 0.0047 | 0.409 |

TABLE 2

| Steels | Primary annealing | | Secondary annealing | | Mechanical properties | | | | | | | |
|---|---|---|---|---|---|---|---|---|---|---|---|---|
| | Temp. (° C.) | Time | Temp. (° C.) | Time | YS (MPa) | TS (MPa) | E1 (%) | TS*E1 (MPa %) | HER (%) | TS*HER (MPa %) | YR | Notes |
| Comparative Steel 1 | 900 | 60 sec | 830 | 60 sec | 497 | 1048 | 21.6 | 22637 | Not measured | — | 0.47 | *CS 1 |
| Comparative Steel 2 | 900 | 60 sec | 790 | 60 sec | 704 | 1501 | 9.6 | 14410 | Not measured | — | 0.47 | CS 2 |
| Inventive Steel 1 | 800 | 60 sec | 600 | 3 hr | 776 | 1101 | 32.6 | 35893 | 23.0 | 25323 | 0.70 | **IS 1 |
| | 800 | 60 sec | 630 | 3 hr | 780 | 1199 | 30.3 | 36330 | 5.0 | 5995 | 0.65 | CS 3 |
| | — | — | 630 | 3 hr | 864 | 1131 | 25.9 | 29330 | 1.2 | 1357 | 0.76 | CS 4 |
| Comparative Steel 3 | 800 | 60 sec | 630 | 3 hr | 803 | 1263 | 27.2 | 34354 | 1.9 | 2400 | 0.64 | CS 5 |
| | — | — | 630 | 3 hr | 907 | 1143 | 23.6 | 26975 | 1.6 | 1829 | 0.79 | CS 6 |
| Inventive Steel 2 | 800 | 60 sec | 600 | 3 hr | 827 | 1120 | 33.4 | 37408 | 22.1 | 24752 | 0.74 | IS 2 |
| | 800 | 60 sec | 630 | 3 hr | 834 | 1199 | 31.9 | 38248 | 4.3 | 5156 | 0.70 | CS 7 |
| | — | — | 630 | 3 hr | 869 | 1138 | 33.2 | 37782 | 2.3 | 2617 | 0.76 | CS 8 |
| Inventive Steel 3 | 800 | 60 sec | 600 | 3 hr | 853 | 1119 | 33.1 | 37039 | 21.0 | 23499 | 0.76 | IS 3 |
| | 800 | 60 sec | 630 | 3 hr | 862 | 1194 | 31.8 | 37969 | 5.7 | 6806 | 0.72 | CS 9 |
| Comparative Steel 4 | 800 | 60 sec | 630 | 3 hr | 836 | 1223 | 35.4 | 43294 | 2.2 | 2691 | 0.68 | CS 10 |
| | — | — | 630 | 3 hr | 888 | 1139 | 35.8 | 40776 | 1.5 | 1709 | 0.78 | CS 11 |

TABLE 2-continued

| Steels | Primary annealing Temp. (° C.) | Time | Secondary annealing Temp. (° C.) | Time | Mechanical properties YS (MPa) | TS (MPa) | El (%) | TS*El (MPa %) | HER (%) | TS*HER (MPa %) | YR | Notes |
|---|---|---|---|---|---|---|---|---|---|---|---|---|
| Comparative | 800 | 60 sec | 600 | 3 hr | 895 | 1181 | 34.8 | 41099 | 14.7 | 17361 | 0.76 | CS 12 |
| Steel 5 | 800 | 60 sec | 630 | 3 hr | 901 | 1260 | 33.7 | 42462 | 1.5 | 1890 | 0.72 | CS 13 |
|  | — | — | 630 | 3 hr | 947 | 1201 | 35.4 | 42515 | 1.0 | 1201 | 0.79 | CS 14 |
| Comparative | 800 | 60 sec | 630 | 3 hr | 936 | 1228 | 32.8 | 40278 | 1.4 | 1719 | 0.76 | CS 15 |
| Steel 6 | — | — | 630 | 3 hr | 1005 | 1176 | 26.6 | 31282 | 0.5 | 588 | 0.85 | CS 16 |
| Inventive | 800 | 60 sec | 600 | 3 hr | 943 | 1147 | 32.3 | 37048 | 20.0 | 22940 | 0.82 | IS 4 |
| Steel 4 | 800 | 60 sec | 600 | 10 hr | 886 | 1149 | 35.9 | 41249 | Not measured | — | 0.77 | IS 5 |
|  | 800 | 60 sec | 600 | 20 hr | 915 | 1097 | 37.3 | 40918 | Not measured | — | 0.83 | IS 6 |
|  | 800 | 60 sec | 630 | 3 hr | 944 | 1231 | 30.9 | 38038 | 3.6 | 4432 | 0.77 | CS 17 |
|  | 750 | 3 hr | 300 | 3 hr | 1309 | 1540 | 4.9 | 7546 | Not measured | — | 0.85 | CS 18 |
|  | 750 | 3 hr | 400 | 3 hr | 1360 | 1450 | 12.9 | 18705 | Not measured | — | 0.94 | CS 19 |
|  | 750 | 3 hr | 500 | 3 hr | 1051 | 1160 | 12.3 | 14268 | Not measured | — | 0.91 | CS 20 |
|  | 750 | 3 hr | 600 | 3 hr | 850 | 1092 | 32.4 | 35381 | 28.0 | 30576 | 0.78 | IS 7 |
|  | 750 | 3 hr | 600 | 10 hr | 804 | 1110 | 36.6 | 40626 | Not measured | — | 0.72 | IS 8 |
|  | 750 | 3 hr | 600 | 20 hr | 787 | 1057 | 36.1 | 38158 | Not measured | — | 0.74 | IS 9 |
|  | 750 | 3 hr | 600 | 10 min | 1037 | 1165 | 13.6 | 15844 | Not measured | — | 0.89 | CS 21 |
|  | 750 | 3 hr | 630 | 3 hr | 778 | 1296 | 29.6 | 38362 | 5.0 | 6480 | 0.60 | CS 22 |
|  | — | — | 750 | 3 hr | 944 | 1560 | 1.4 | 2184 | Not measured | — | 0.60 | CS 23 |
|  | — | — | 600 | 3 hr | 1125 | 1076 | 11.4 | 12266 | 27.0 | 29052 | 1.05 | CS 24 |
|  | — | — | 630 | 3 hr | 918 | 1270 | 26.0 | 33020 | 2.2 | 2794 | 0.72 | CS 25 |
| Inventive | 800 | 60 sec | 600 | 3 hr | 1182 | 1218 | 31.3 | 38123 | 18.6 | 22655 | 0.97 | IS 10 |
| Steel 5 | 700 | 3 hr | 600 | 3 hr | 1032 | 1181 | 21.6 | 25510 | 20.6 | 24329 | 0.87 | IS 11 |
|  | 700 | 3 hr | 600 | 10 hr | 960 | 1167 | 25.8 | 30109 | 19.5 | 22757 | 0.82 | IS 12 |
|  | 750 | 3 hr | 600 | 3 hr | 1011 | 1147 | 22.5 | 25808 | 21.3 | 24431 | 0.88 | IS 13 |
|  | 850 | 60 sec | 640 | 60 sec | 1160 | 1259 | 23.4 | 29461 | 13.3 | 16745 | 0.92 | CS 26 |
| Inventive | 800 | 60 sec | 600 | 3 hr | 993 | 1145 | 29.5 | 33778 | 17.0 | 19465 | 0.87 | IS 14 |
| Steel 6 | 800 | 60 sec | 630 | 3 hr | 1014 | 1210 | 32.8 | 39688 | 4.0 | 4840 | 0.84 | CS 27 |
|  | — | — | 600 | 3 hr | 1168 | 1106 | 13.4 | 14820 | 22.0 | 24332 | 1.06 | CS 28 |
|  | — | — | 600 | 20 hr | 983 | 983 | 29.7 | 29195 | 18.0 | 17694 | 1.00 | CS 29 |
| Inventive | 800 | 60 sec | 570 | 3 hr | 1109 | 1177 | 26.3 | 30955 | 19.5 | 22952 | 0.94 | IS 15 |
| Steel 7 | 800 | 60 sec | 600 | 3 hr | 1107 | 1193 | 25.8 | 30779 | 22.0 | 26246 | 0.93 | IS 16 |
|  | 800 | 60 sec | 630 | 3 hr | 929 | 1336 | 29.2 | 39011 | 7.2 | 9619 | 0.70 | CS 30 |
|  | 750 | 3 hr | 600 | 3 hr | 965 | 1145 | 22.4 | 25648 | 23.0 | 26335 | 0.84 | IS 17 |
| Inventive | 800 | 60 sec | 600 | 3 hr | 1084 | 1204 | 25.9 | 31184 | 22.0 | 26488 | 0.90 | IS 18 |
| Steel 8 | — | — | 600 | 3 hr | 1376 | 1434 | 2.0 | 2868 | Not measured | — | 0.96 | CS 31 |
| Inventive Steel 9 | 750 | 3 hr | 600 | 3 hr | 863 | 1088 | 25.1 | 27309 | 28.0 | 30464 | 0.79 | IS 19 |
| Inventive Steel 10 | 750 | 3 hr | 600 | 3 hr | 833 | 1023 | 26.1 | 26700 | 26.0 | 26598 | 0.81 | IS 20 |
| Comparative Steel 7 | 700 | 3 hr | 580 | 10 hr | 902 | 1175 | 30.1 | 35368 | 5.7 | 6700 | 0.77 | CS 32 |
|  | 750 | 3 hr | 600 | 3 hr | 760 | 1237 | 25.7 | 31791 | 8.3 | 10267 | 0.61 | CS 33 |
| Comparative Steel 8 | 750 | 3 hr | 600 | 3 hr | 656 | 1345 | 13.1 | 17620 | 1.8 | 2421 | 0.49 | CS 34 |
| Inventive Steel 11 | 700 | 3 hr | 600 | 3 hr | 716 | 1116 | 23.8 | 26561 | 26.8 | 29909 | 0.64 | IS 21 |
|  | 800 | 60 sec | 600 | 3 hr | 847 | 1109 | 26.2 | 29056 | 25.2 | 27947 | 0.76 | IS 22 |

*CS: Comparative Sample,
**IS: Inventive Sample
In Table 2, YS refers to yield strength, TS refers to tensile strength, El refers to elongation, and HER refers to a hole expansion ratio.

In Table 2, YS refers to yield strength, TS refers to tensile strength, El refers to elongation, and HER refers to a hole expansion ratio.

In Table 2, an HER was not measured when EL or TS*El was too low to evaluate the HER or when the same heat treatment conditions were applied.

In the present invention, TS*HER regression equation was derived using samples of which HERs were measured as shown in Table 2, and in the TS*HER regression equation, contents of elements (wt %), and the temperature (° C.) and time (hr) of the secondary annealing process were used as independent variables.

$$TS*HER = 365359 - (28706*C) - (1000*Si) - (5205*Mn) - (194664*Ti) + (153908*Nb) + (44019*V) - (20397*Mo) - (11305*Al) - (4410759*P) + (259652*S) + (1510558*N) - (442*temperature) - (537*hr) \quad [TS*HER \text{ regression equation}]$$

Furthermore, mutual effects of C and Mn, key factors in determining the HER in the regression equation of the present invention, were checked, and Formula 1 was derived. In more detail, if the coefficients of C and Mn are respectively divided by the atomic weights of C and Mn: 12 and 54.9, 2392.2 and 94.8 are obtained. This means that the effect of carbon (C) is about 25 times the effect of manganese (Mn), and thus C+(Mn/25) is used as a factor for guaranteeing strength and hole expandability required in the present invention.

In particular, all comparative steels not satisfying the alloy composition proposed in the present invention have the factor, C+(Mn/25), in the range of 0.468 or greater. Thus, it is required to adjust C+(Mn/25) to be 0.46 or less so as to guarantee both strength and hole expandability according to the present invention.

As shown in Tables 1 and 2, Inventive Samples 1 to 22 satisfying the alloy composition and manufacturing conditions of the present invention have a tensile strength of 1000 MPa or greater and a yield strength of 700 MPa or greater, thereby providing steel plates having a yield ratio of 0.6 or greater. In addition, elongation of 21% or greater is guaranteed, thereby ensuring TS*El of 25,000 MPa % or greater and HER of 15% or greater and having a positive effect on press formability.

However, samples (Comparative Samples 3, 4, 7 to 9, and 17 to 31) having compositions as proposed in the present invention but not satisfying annealing conditions proposed in the present invention did not satisfy properties required in the present invention.

In particular, Comparative Samples 4, 8, 23 to 25, 28, 29, and 31, which were annealed only through the final annealing process, were inferior in at least one of strength, ductility, and hole expandability.

Furthermore, in the cases in which all the primary and secondary annealing processes were performed but the final annealing temperature was higher than 620° C. (Comparative Samples 3, 7, 9, 17, 22, 26, 27, and 30), hole expandability was poor. Furthermore, in the cases in which the final annealing temperature was lower than 550° C. (Comparative Samples 18 to 20) or the final annealing time was less than 30 minutes (Comparative Sample 21), due to insufficient ductility, TS*El was less than 25,000 MPa %, and it was useless to evaluate hole expandability.

Furthermore, in Comparative Samples 1 and 2 satisfying manufacturing conditions proposed in the present invention but not satisfying the steel composition proposed in the present invention, due to insufficient strength, TS*El was less than 25,000 MPa %, and it was useless to evaluate hole expandability.

Furthermore, in Comparative Samples 12, 32, and 33, strength and ductility were guaranteed, but hole expandability was poor. In addition, all the strength, ductility, and hole expandability of Comparative Sample 34 were poor.

All Comparative Samples 5, 10, 11, and 13 to 16, not satisfying the steel composition and manufacturing conditions proposed in the present invention, had poor hole expandability.

In addition, cold-rolled steel plates having the composition of Inventive Steel 4 were heat treated (primarily annealed) at 750° C. for 3 hours, and then heat treated (secondarily annealed) at 300° C. to 630° C. for 3 hours. Thereafter, physical properties of samples of the cold-rolled steel plates were evaluated as illustrated in FIG. 1.

As a result, a sample, which was secondarily annealed at 500° C. or less, had a TS*El value of less than 25,000 MPa %, and samples, which were secondarily annealed respectively at 600° C. and 630° C., had high TS*EL values and a yield ratio (YR) of 0.6 or greater. In view of hole expandability, however, the sample heat treated at 630° C. had an HER of 5%, but the sample heat treated at 600° C. had a high HER, 28%.

In particular, as shown in FIG. 1, as the temperature of the secondary annealing process increases, tensile strength gradually decreases and then increases, and the behavior at the annealing temperature of 300° C. to 500° C. is considered as a result of a decrease in strength and an increase in elongation caused by tempering of martensite in the first heat treatment (the first annealing process).

Figure 2:
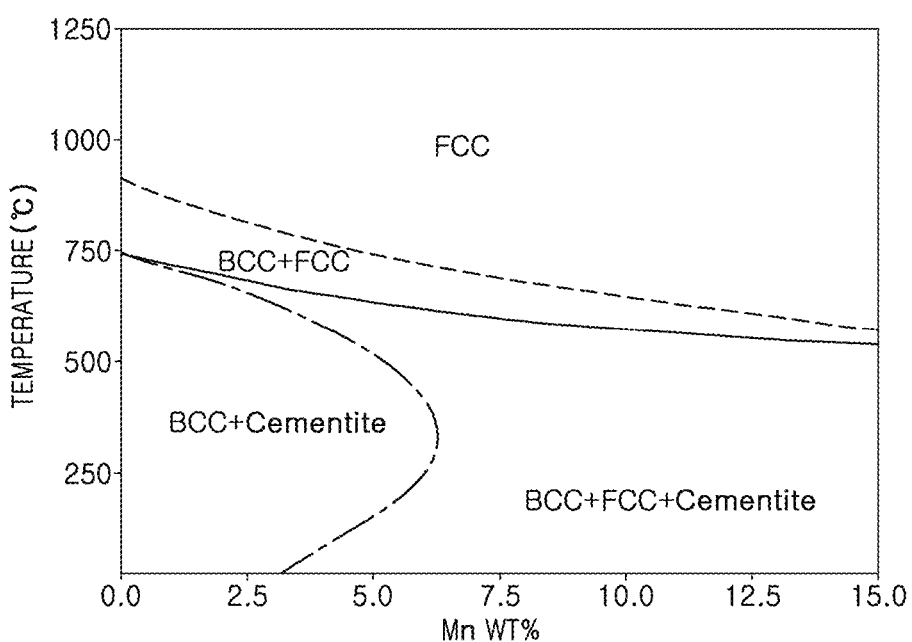
FIG. 2 illustrates an equilibrium diagram of 0.14C-7Mn-1Si steel (corresponding to Inventive Steel 4) plotted using Thermo-Calc (a thermodynamic calculation program by Thermo-Calc Software).

In addition, when the secondary annealing process was performed at a low temperature of 300° C. to 500° C. for a time period much longer than 3 hours, as shown in the equilibrium diagram of FIG. 2, austenite having a FCC structure could be formed in large amounts, but it was considered that the HER was low because of a hardness difference between phases caused by partitioning of carbon (C), manganese (Mn), or the like into the austenite.

In addition, when the secondary heat treatment temperature was greater than 500° C., elongation was markedly increased, and when the heat treatment temperature increased from 600° C. to 630° C., tensile strength increased again. The reason therefor was considered as follows.

During the secondary annealing process, the amount of austenite increased due to a high annealing temperature, and the strength of annealed martensite decreased, thereby increasing a hardness difference between phases and worsening hole expandability.

Figure 3:
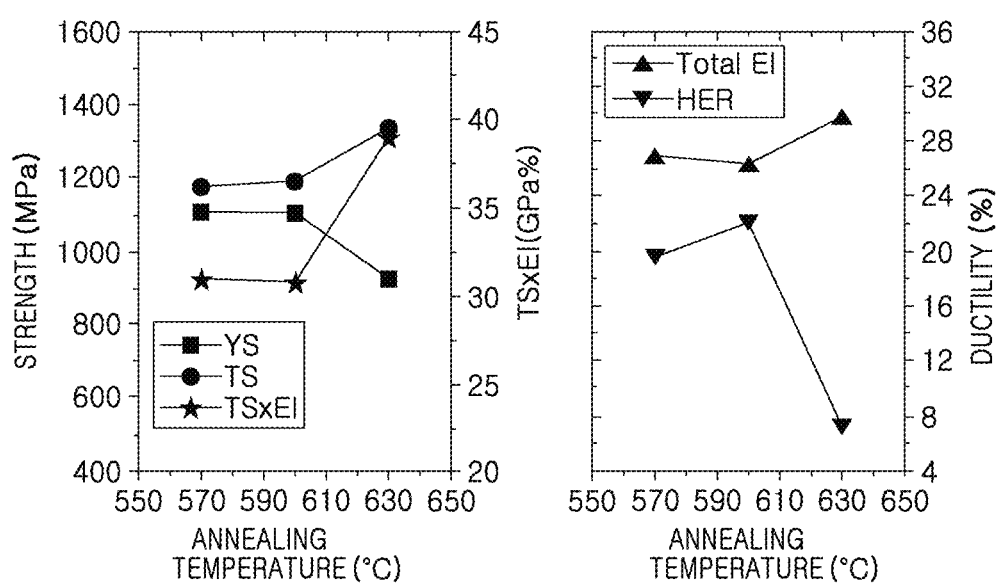
FIG. 3 illustrates graphs showing mechanical properties with respect to temperature during a final annealing process (secondary annealing) of Inventive Steel 7 according to an example of the present invention.

In addition, FIG. 3 illustrates variations in the physical properties of cold-rolled steel plates having the composition of Inventive Steel 7 during the final heat treatment (secondary annealing).

Referring to results shown in FIG. 3, tensile strength was higher in the case of performing the heat treatment at 630° C. than in the cases of performing the heat treatment at 570° C. and 600° C., and TS*El also had the same upward trend. That is, these properties behaved similarly to the case of using Inventive Steel 4. In addition, high HERs were measured in the cases of performing the heat treatment at 570° C. and 600° C., but a markedly low HER was measured in the case of performing the heat treatment at 630° C.

Figure 4A:
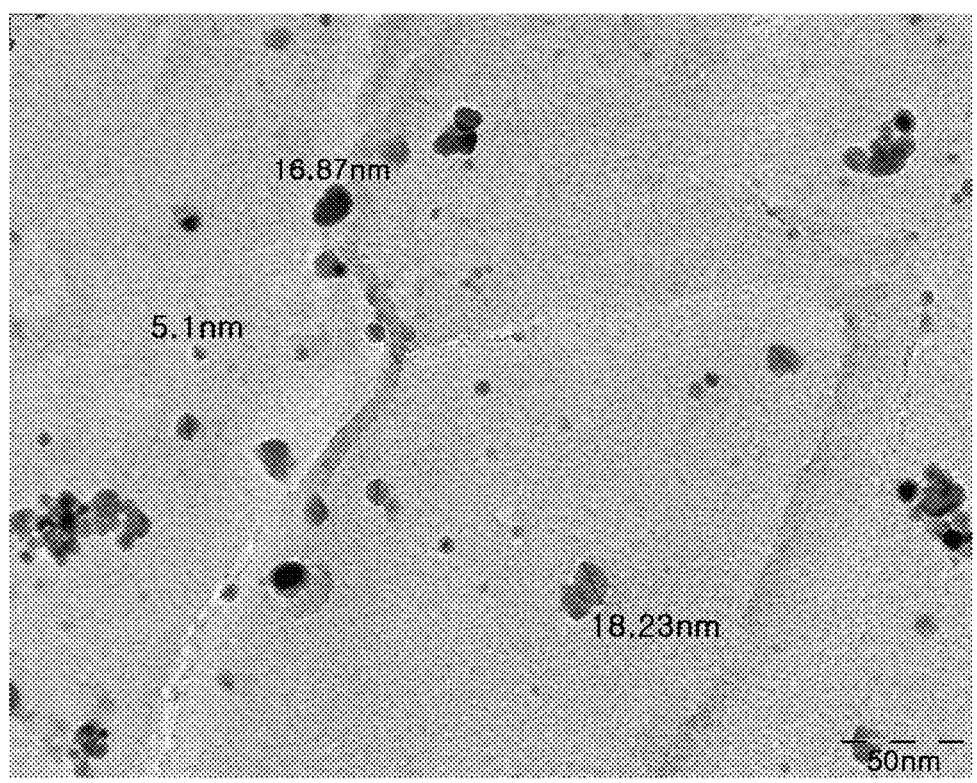
FIGS. 4A and 4B are a TEM photo of precipitates and an EDS graph of Inventive Steel 7 after a final annealing process according to an example of the present invention (values in FIG. 4A are the sizes (diameters) of precipitates).
Figure 4B:
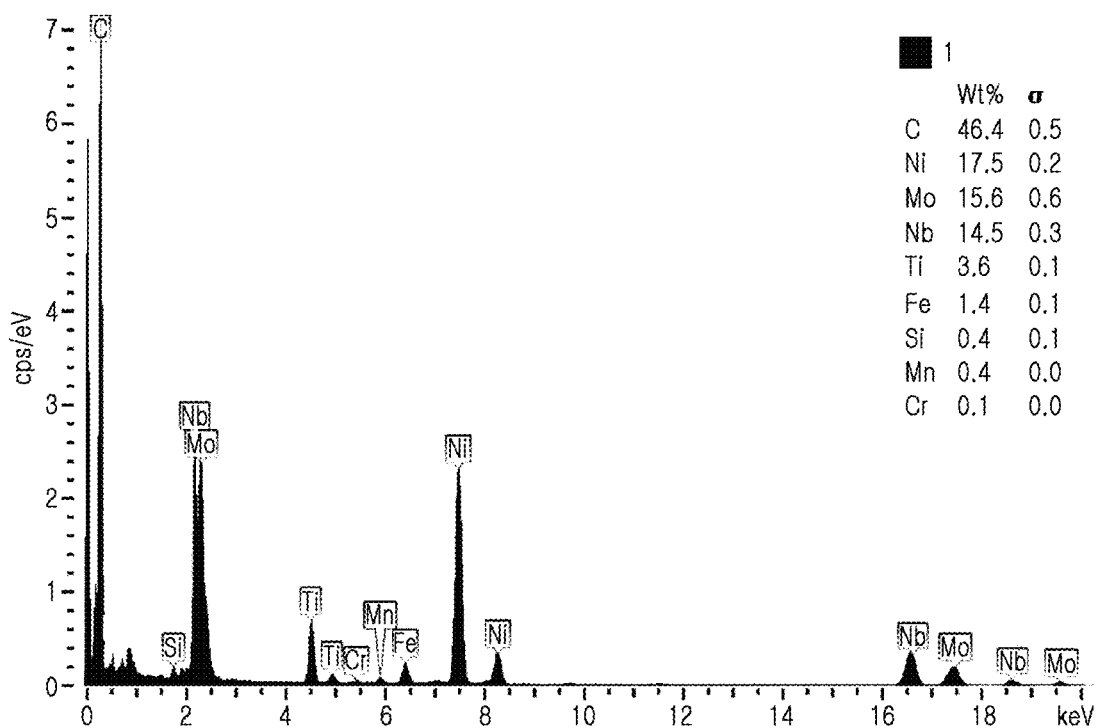

Inventive Steel 7 additionally included molybdenum (Mo) and thus had higher yield strength than Inventive Steel 4 not including molybdenum (Mo). This may be clearly understood from the microstructure of Inventive Sample 16 prepared using Inventive Steel 7 and observed using a TEM. That is, as shown in FIG. 4A, the reason therefor is the formation of a fine carbide having a size of 30 nm or less, that is, the formation of (Ti,Nb,Mo)C.

In that case, a sample for TEM measurement was prepared by a carbon extraction replica method.

Figure 5:
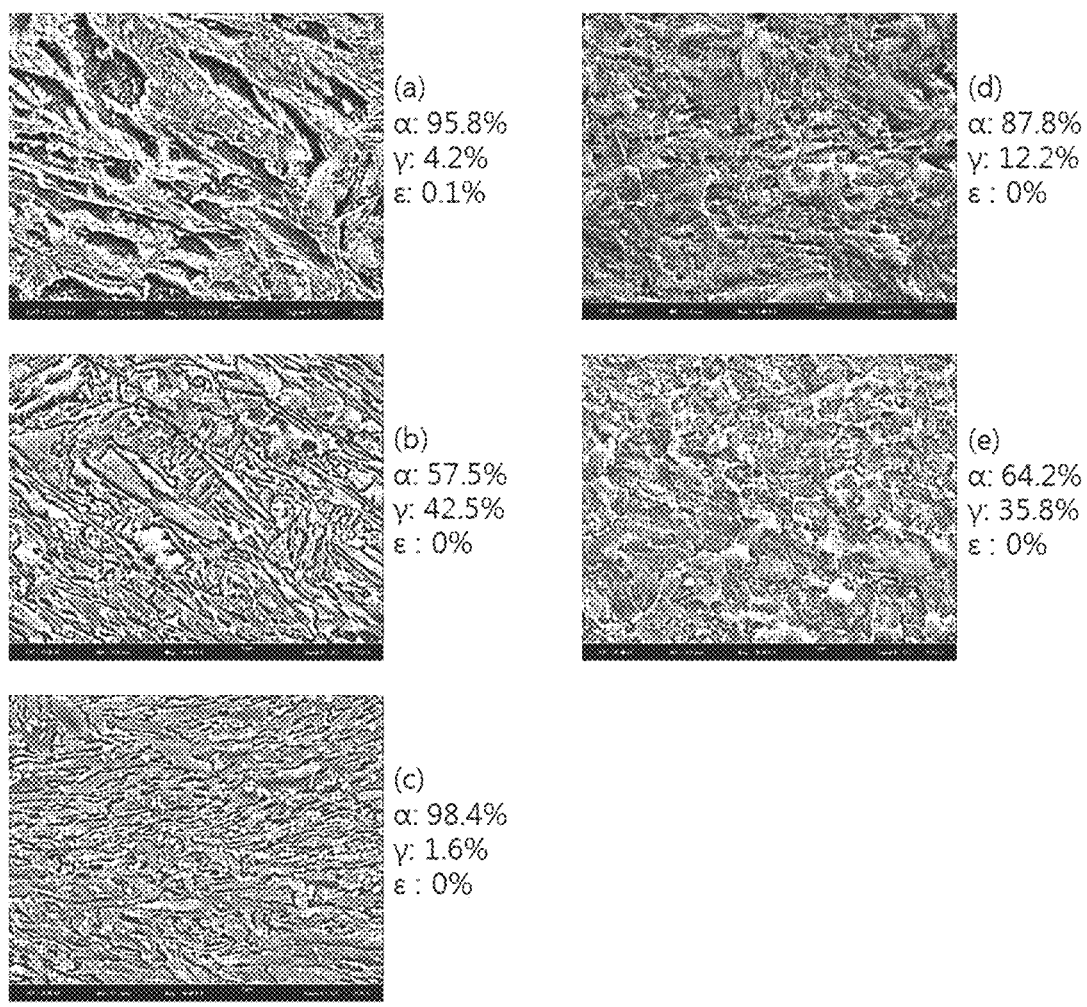
FIG. 5 illustrates variations in the microstructure and phase fractions of Inventive Steel 7 during processes according to an example of the present invention.

In addition, the inventors have observed an SEM microstructure and phase fractions of Inventive Sample 16 having the composition of Inventive Steel 7 during processes from hot rolling to final annealing (secondary annealing), and FIG. 5 shows results thereof. In that case, Nital etching was used for the SEM observation, and the phase fractions were measured using an X-ray method because the microstructure was very small and thus it was difficult to distinguish phases from each other. In the phase fractions, a refers to all of bcc martensite, annealed martensite, and ferrite.

As shown in FIG. 5, transformation to martensite occurred during cooling after hot rolling because Inventive Steel 7 had manganese (Mn) in an amount of 7% or greater (7.16%) and thus, high hardenability.

In particular, in the case of a hot-rolled steel plate having a high martensite fraction on the level of 95.8% and thus a tensile strength of 1500 MPa or greater, it was difficult to perform a cold rolling process on the hot-rolled steel plate. However, according to the present invention, the hot-rolled steel plate was heat treated (heat treatment before cold rolling) within a certain temperature range for 30 minutes or longer. Thus, after the heat treatment, retained austenite was formed in a high fraction, and some of the martensite observed in the hot-rolled steel plate was reverse transformed into austenite while the other of the martensite was transformed into annealed martensite.

Thereafter, when cold rolling was performed to obtain a thickness required by a customer, most of the austenite was transformed into martensite due to deformation, and the dislocation density of the annealed martensite increased due to cold rolling deformation. That is, about a half of a appearing in a fraction of 98.4% after the cold rolling was martensite transformed from austenite due to deformation, and about the other half was annealed martensite having a high dislocation density due to cold rolling deformation.

According to the present invention, this cold-rolled steel plate was primarily annealed at a temperature of Ac3 or higher, and then retained austenite was present in a fraction of 12.2%. Thereafter, the cold-rolled steel plate was finally annealed at 600° C. for 3 hours, thereby facilitating the formation of austenite and obtaining austenite in a fraction of 35.8%.

Referring to the phase fractions in the microstructure during the processes, it may be required to decrease strength in the case of the present invention containing manganese (Mn) in an amount of 4% to 10%, and thus a heat treatment is performed before cold rolling. In this case, since Ac1 varies with the content of manganese (Mn), the heat treatment is performed within a proper temperature range by considering variations of Ac1.

As checked with FIG. 1, the trend, in which the HER was markedly varied according to whether the final annealing was performed at 600° C. or 630° C., was the same in various composition systems. That is, the same results were observed in Inventive Sample 1 and Comparative Sample 3 prepared using Inventive Steel 1, Inventive Sample 2 and Comparative Sample 7 prepared using Inventive Steel 2, Inventive Sample 3 and Comparative Sample 9 prepared using Inventive Steel 3, and Inventive Sample 14 and Comparative Sample 27 prepared using Inventive Steel 6.

However, Comparative Samples 32 to 34 prepared using Comparative Steels 7 and 8 and finally annealed at 600° C. had very low HERs even though the carbon (C) contents thereof were similar, and the reason therefor is that C+(Mn/25) values of Comparative Steels 7 and 8 were outside the range proposed in the present invention, that is, 0.47 and 0.51, due to excessive manganese (Mn) contents. However, Inventive Steel 11, having a low carbon (C) content and a high manganese (Mn) content, had a low C+(Mn/25) value on the level of 0.409 and thus high hole expandability.

The effect of the final heat treatment time was examined using cold-rolled steel plates having the composites of Inventive Steels 4 and 5. As checked with Inventive Samples 7 to 9 and Comparative Sample 21, Comparative Sample 21 finally annealed for a short time of 10 minutes had poor elongation and hole expandability, but Inventive Samples 7 to 9 finally annealed for a long time had high elongation and hole expandability. That is, it is necessary to optimally control the final annealing time as well as the final annealing temperature.

In addition, Comparative Samples 12 and 13, prepared using cold-rolled steel plates having the composition of Comparative Steel 5 containing a relatively low carbon (C) content while varying the final annealing temperature, showed results similar to those of the inventive steels. That is, a material heat treated at 600° C. had a higher HER than a material heat treated at 630° C., but even the higher HER was less than 15%, the target value of the present invention. In addition, due to high carbon (C) contents, spot weldability required for automotive structural steel materials was poor.

According to the present invention, annealing may be performed step by step after cold rolling so as to guarantee high ductility and hole expandability as well as high yield strength and tensile strength.

This could be clearly confirmed by the examples. As shown in Inventive Sample 7 and Comparative Sample 24 prepared using cold-rolled steel plates having the composition of Inventive Steel 4, Comparative Sample 24 on which an austenite single phase heat treatment, that is, the primary annealing, was not performed had high hole expandability owing to secondary annealing at 600° C. However, Comparative Sample 24 had 0.2% offset yield strength greater than its tensile strength and had very low ductility. Thus, Comparative Sample 24 did not have a TS*El value within the range of 25,000 MPa % or greater required in the present invention. The reason therefor is that recrystallization of a deformed microstructure did not completely occur because the final annealing was directly performed on the cold-rolled material. In addition, Comparative Sample 25, on which final annealing was performed at 630° C. without performing primary annealing, had high strength and ductility but poor hole expandability. In this case, since Comparative Sample 25 has poor cold press formability, Comparative Sample 25 may not be suitable as a material for manufacturing automotive structural members through a cold press forming process.

In addition, Comparative Steels 1 and 2 having a low manganese (Mn) content on the level of less than 4% had low elongation even though annealing was performed step by step according to the present invention, and thus the TS*El values of Comparative Steels 1 and 2 were outside the range of 25,000 MPa % or greater required in the present invention. However, the TS*EL values of Inventive Steels 9 and 10 respectively having 6.18% manganese (Mn) and 5.21% manganese (Mn) were 25,000 MPa % or greater.

The invention claimed is:

1. A steel plate, the steel plate comprising:
by wt %, carbon (C): 0.04% to 0.17%, silicon (Si): 2% or less, manganese (Mn): 4% to 10%, phosphorous (P): 0.05% or less (excluding 0%), sulfur (S): 0.02% or less (excluding 0%), aluminum (Al): 0.5% or less (excluding 0%), nitrogen (N): 0.02% or less (excluding 0%), and a balance of iron (Fe) and inevitable impurities;
a microstructure comprising retained austenite in a volume fraction of 20% or greater and annealed martensite in a volume fraction of 50% or greater; and
a hole expansion ratio of 15% or greater,
wherein the carbon (C) and the manganese (Mn) satisfy Formula 1 below, $$C+(Mn/25) \leq 0.46. \qquad \text{[Formula 1]}$$

2. The steel plate of claim 1, further comprising at least one selected from titanium (Ti): 0.1% or less (excluding 0%), niobium (Nb): 0.1% or less (excluding 0%), vanadium (V): 0.2% or less (excluding 0%), and molybdenum (Mo): 0.5% or less (excluding 0%).

3. The steel plate of claim 1, further comprising at least one selected from zirconium (Zr): 0.001% to 0.1%, and tungsten (W): 0.001% to 0.5%.

4. The steel plate of claim 1, further comprising at least one selected from nickel (Ni): 1% or less (excluding 0%), copper (Cu): 0.5% or less (excluding 0%), and chromium (Cr): 1% or less (excluding 0%).

5. The steel plate of claim 1, further comprising at least one selected from antimony (Sb): 0.04% or less (excluding 0%), calcium (Ca): 0.01% or less (excluding 0%), and boron (B): 0.01% or less (excluding 0%).

6. The steel plate of claim 1, further comprising: a tensile strength of 980 MPa or greater, a yield ratio (yield strength/ tensile strength) of 0.6 or greater, and a product of tensile strength and elongation within a range of 25,000 MPa % or greater.

7. The steel plate of claim 1, wherein the steel plate comprises one of a cold-rolled steel plate, a hot-dip galvanized steel plate, and a hot-dip galvannealed steel plate.

* * * * *